United States Patent
Gao et al.

(10) Patent No.: US 12,063,946 B2
(45) Date of Patent: *Aug. 20, 2024

(54) HIGH MOISTURE EDIBLE COMPOSITIONS AND METHODS OF PREPARATION THEREOF

(71) Applicant: WM. WRIGLEY JR. COMPANY, Chicago, IL (US)

(72) Inventors: Yang Gao, Chicago, IL (US); Emine Unlu, Chicago, IL (US); Shanna Christine Dabson, Chicago, IL (US)

(73) Assignee: Wm. Wrigley Jr. Company, Chicago, IL (US)

(*) Notice: Subject to any disclaimer, the term of this patent is extended or adjusted under 35 U.S.C. 154(b) by 64 days.

This patent is subject to a terminal disclaimer.

(21) Appl. No.: 17/339,641

(22) Filed: Jun. 4, 2021

(65) Prior Publication Data

US 2022/0159991 A1  May 26, 2022

Related U.S. Application Data

(62) Division of application No. 15/765,290, filed as application No. PCT/US2016/055716 on Oct. 6, 2016, now abandoned.

(60) Provisional application No. 62/384,075, filed on Sep. 6, 2016, provisional application No. 62/297,410, filed on Feb. 19, 2016, provisional application No. 62/237,906, filed on Oct. 6, 2015, provisional application No. 62/237,886, filed on Oct. 6, 2015.

(51) Int. Cl.

| | |
|---|---|
| *A23G 3/48* | (2006.01) |
| *A23B 7/00* | (2006.01) |
| *A23B 7/01* | (2006.01) |
| *A23G 3/34* | (2006.01) |
| *A23G 3/36* | (2006.01) |
| *A23G 3/42* | (2006.01) |
| *A23L 3/01* | (2006.01) |
| *A23L 3/015* | (2006.01) |
| *A23L 19/00* | (2016.01) |
| *A23L 25/00* | (2016.01) |
| *A23L 29/00* | (2016.01) |
| *A23L 29/231* | (2016.01) |
| *A23L 29/238* | (2016.01) |
| *A23L 29/256* | (2016.01) |
| *A23L 29/269* | (2016.01) |

(52) U.S. Cl.
CPC .................. *A23G 3/48* (2013.01); *A23B 7/00* (2013.01); *A23B 7/01* (2013.01); *A23B 7/012* (2013.01); *A23G 3/34* (2013.01); *A23G 3/364* (2013.01); *A23G 3/42* (2013.01); *A23L 3/01* (2013.01); *A23L 3/015* (2013.01); *A23L 3/0155* (2013.01); *A23L 19/07* (2016.08); *A23L 19/09* (2016.08); *A23L 25/00* (2016.08); *A23L 29/035* (2016.08); *A23L 29/06* (2016.08); *A23L 29/231* (2016.08); *A23L 29/238* (2016.08); *A23L 29/256* (2016.08); *A23L 29/272* (2016.08); *A23V 2002/00* (2013.01); *A23V 2200/02* (2013.01); *A23V 2200/044* (2013.01); *A23V 2200/15* (2013.01); *A23V 2250/022* (2013.01); *A23V 2250/032* (2013.01); *A23V 2250/036* (2013.01); *A23V 2250/042* (2013.01); *A23V 2250/044* (2013.01); *A23V 2250/056* (2013.01); *A23V 2250/5024* (2013.01); *A23V 2250/5054* (2013.01); *A23V 2250/5072* (2013.01); *A23V 2300/24* (2013.01)

(58) Field of Classification Search
None
See application file for complete search history.

(56) References Cited

U.S. PATENT DOCUMENTS

| | | |
|---|---|---|
| 2004/0057981 A1 | 3/2004 | Base et al. |
| 2008/0014303 A1 | 1/2008 | Jacops et al. |
| 2010/0068351 A1 | 3/2010 | Roth |
| 2010/0112172 A1 | 5/2010 | Patterson et al. |
| 2011/0313055 A1 | 12/2011 | Ervin et al. |
| 2013/0316056 A1 | 11/2013 | Parducci et al. |

FOREIGN PATENT DOCUMENTS

| | | | | |
|---|---|---|---|---|
| CN | 1465257 A | * | 1/2004 | |
| EP | 0515864 | | 12/1992 | |
| EP | 0515864 A1 | | 12/1992 | |
| EP | 1674088 A1 | * | 6/2006 | ........... A61K 31/155 |
| RU | 2235480 C2 | | 9/2004 | |
| SU | 1374009 A1 | | 2/1988 | |
| WO | 2002007530 A1 | | 1/2002 | |
| WO | 02071871 A1 | | 9/2002 | |
| WO | 2004049824 A1 | | 6/2004 | |
| WO | WO-2004094824 A2 | * | 11/2004 | ........... G05D 7/0676 |
| WO | 2006039372 A2 | | 4/2006 | |
| WO | 2009080093 A1 | | 7/2009 | |

(Continued)

*Primary Examiner* — Jyoti Chawla

(74) *Attorney, Agent, or Firm* — Bookoff McAndrews, PLLC

(57) ABSTRACT

The present invention is direct to an edible composition in which fruit, vegetables and/or nuts, in conjunction with a hydrocolloid, are treated with pressure and/or heat to form an edible composition that is dimensionally stable, ambient stable for at least 12 months, has a moisture content greater than 50 wt. %, has a pH less than 4.5, has a water activity greater than 0.5, is commercially sterile, is free of artificial flavors, has a solids content greater than 10 wt. %, and does not exhibit syneresis. Also provided is a method for preparation of the edible composition.

17 Claims, 6 Drawing Sheets

(56) References Cited

FOREIGN PATENT DOCUMENTS

| | | |
|---|---|---|
| WO | 2013133711 A1 | 9/2013 |
| WO | 2014060565 A1 | 4/2014 |
| WO | 2014126151 A1 | 8/2014 |

* cited by examiner

HIGH MOISTURE EDIBLE COMPOSITIONS AND METHODS OF PREPARATION THEREOF

CROSS-REFERENCE TO RELATED APPLICATIONS

This application is a divisional of U.S. application Ser. No. 15/765,290, filed on Apr. 2, 2018, which is a National Stage Application of International Patent Application No. PCT/US16/55716, having an International Filing Date of Oct. 6, 2016, which claims the benefit of U.S. Provisional Application No. 62/384,075, filed Sep. 6, 2016, U.S. Provisional Application No. 62/297,410, filed Feb. 19, 2016, U.S. Provisional Application No. 62/237,886, filed Oct. 6, 2015, and U.S. Provisional Application No. 62/237,906, filed Oct. 6, 2015, the entire contents of each of which are hereby incorporated by reference in their entirety.

TECHNICAL FIELD

The present invention relates generally to food products and to their methods of preparation. More particular, the present invention relates to a packaged fruit and/or vegetable based edible composition, that is dimensionally stable, is ambient stable for at least 12 months, has a moisture content greater than 50 wt. %, is commercially sterile, is free of artificial sweeteners, has a solids content greater than 10 wt. %, and does not exhibit syneresis, as well as to their methods of preparation using pressure and/or heat.

BACKGROUND OF THE INVENTION

Increased health awareness has led to increased consumption of fresh fruits and vegetables as a snack food. However, fresh fruits and vegetables are seasonal, and undergo fairly rapid spoilage. Furthermore, certain fresh fruits, such as mango, are not easy to consume as a snack food, especially by children.

Although fruit and vegetable-based snack foods having extended shelf lives are commercially available, these typically possess unwanted additives (e.g., added sugar, artificial sweeteners and colors, etc.). Additionally, these snack foods are often subjected to process conditions (e.g., high heat to cook and/or sterilize) that significantly change their natural organoleptic profile (e.g. flavor, aroma, appearance, nutritional value, etc.). These changes can negatively impact consumer appeal.

Although fruit based snack foods having extended shelf lives are commercially available, these often include additives (e.g., added sugar, artificial sweeteners and colors, etc.) which may be considered undesirable by consumers. Additionally, these snack foods are often subjected to process conditions (e.g., high heat to cook and/or sterilize) that significantly change their natural organoleptic profile (e.g. flavor, aroma, appearance, nutritional value, etc.). These changes can negatively impact consumer appeal. Such products may be in dried forms (e.g. fruit leather and fruit strips, etc) which fail to deliver the important hydration sensation during raw fruit consumption and result in calorie dense products. In other cases, the product may be in dimensionally unstable form (e.g. liquid, sauce) which may be inconvenient for consumers during handling and consumption and also lack the texture sensation and consumer experience (e.g. bite, chew type of behaviors) offered by raw fruits. Additionally, compared to liquid forms, solid products may better help regulate satiety. (Ref: *Wijlens AG1, Erkner A, etc, Obesity (Silver Spring).* 2012 November; 20(11):2226-32. *Effects of oral and gastric stimulation on appetite and energy intake.*)

U.S. Pat. No. 8,586,121 discloses a packaged, shelf-stable, gelled natural fruit pulp, in which the natural pectin of the fruit pulp has been substantially demethoxylated by the action of pectin methyl esterase under ultra-high pressure (UHP) conditions. Also provided is a method of preparation of the packaged, shelf-stable or ambient stable, natural fruit product.

WO 94/12055 discloses a method for preparing a fruit or vegetable gel that includes the addition of pectin esterase to a pulp formed from a fruit or vegetable to demethoxylate the pectin present therein. Optionally, calcium chloride is added, and then the resulting mixture is allowed to form a gel, which may be further processed to obtain the desired food. Notably, the product is not stable or packaged, and is intended as an intermediate for addition to dairy, bakery or confectionery products.

Accordingly, a need remains for a fruit and/or vegetable-based edible composition that is stable under ambient conditions without cooking, and thus still possesses many of the positive attributes or features of the fresh fruit or vegetable from which it is derived, including the natural color, flavor, aroma and/or nutritional value. Ideally, the fresh fruit and/or vegetable-based edible composition has the benefit of having no added refined sugar or artificial sweeteners, and is dimensionally stable for convenient packaging and consumption.

BRIEF SUMMARY OF THE INVENTION

The present inventors have devised method of making such products. The methods further have the advantages of minimal processing and minimal use of non-natural ingredients.

In one aspect, the present invention is directed to an edible composition comprising a mixture which comprises a fruit and/or vegetable base material, a hydrocolloid selected from the group consisting of pectin, agar, locust bean gum, carrageenan, guar gum, tamarind gum and combinations thereof, wherein said edible composition (i) is dimensionally stable, (ii) is stable for at least 12 months at ambient conditions when maintained in a sealed package, (iii) has a moisture content of greater than 50 wt. %, (iv) has a pH of less than 4.5, (v) has a water activity of at least 0.5, (vi) is commercially sterile, (vii) is free of artificial flavors, (viii) has a solids content of greater than 10 wt. %, and (ix) does not exhibit syneresis, wherein the edible composition is contained in a sealed package.

In another aspect, the present invention provides a method of preparing of an edible composition, said method comprising:

forming a mixture comprising (a) a fruit and/or vegetable base material, and (b) a hydrocolloid selected from the group consisting of pectin, agar, locust bean gum, carrageenan, guar gum, tamarind gum and combinations thereof, exposing the mixture to heat and/or pressure sufficient to render the mixture commercially sterile, and packaging the mixture, wherein the edible composition is (i) is dimensionally stable, (ii) is stable for at least 12 months at ambient conditions when maintained in a sealed package, (iii) has a moisture content of greater than 50 wt. %, (iv) has a pH of less than 4.5, (v) has a water activity of at least 0.5, (vi) is commercially sterile, (vii) is free of artificial flavors, (viii) has a solids content of greater than 10 wt. %, and (ix) does not exhibit syneresis.

In yet another aspect of the method detailed above, the mixture is packaged and then exposed to the heat and/or pressure. In an alternative aspect, the mixture is exposed to heat and/or pressure and then packaged.

In yet another aspect of one or more embodiments of the compositions and methods detailed above, the base material may comprise a fruit concentrate, a fruit pulp, a fruit puree, a vegetable concentrate, a vegetable pulp and/or a vegetable puree. In yet another aspect of the invention, the edible composition contains no added sugars.

Optionally, the edible composition as detailed above may also comprise a mixture of different fruits and/or vegetables and/or nuts or some combination thereof. In some embodiments of one or more of the methods and compositions detailed above, the mixture may further comprise an acidulant, a flavoring, a coloring, a sweetener, an antioxidant, a nutritional supplement or some combinations thereof. The mixture may consist or consist essentially of the recited ingredients. In some embodiments, the composition will contain a plant-derived sweetener such as thaumatin, stevia or luo han guo (monk fruit).

BRIEF DESCRIPTION OF THE FIGURES

The disclosure will be better understood, and features, aspects and advantages other than those set forth above will become apparent when consideration is given to the following detailed description thereof. Such detailed description makes reference to the following figures, wherein.

DETAILED DESCRIPTION OF THE INVENTION

Figure 1:
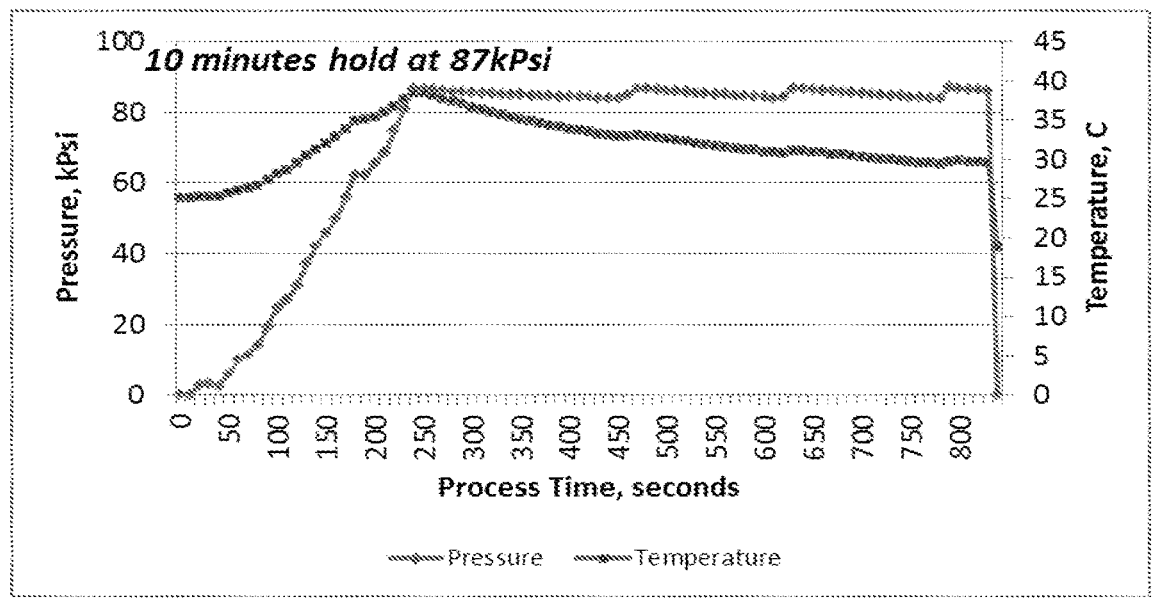
FIG. 1 is a graph of the pressure and temperature profile of a mango based edible composition prepared under UHP conditions for 10 minutes at 600 MPa.

In accordance with the present invention, a packaged, edible composition is provided that is dimensionally stable, ambient stable for at least 12 months, has a moisture content greater than 50 wt. %, has a pH less than 4.5, has a water activity greater than 0.5, is commercially sterile, is free of artificial flavors, has a solids content greater than 10 wt. %, and does not exhibit syneresis, while advantageously possessing many of the positive attributes or features of the fresh fruit and/or vegetable base material from which it is derived, including the natural color, flavor, aroma and/or nutritional value. Such a composition may be prepared using a fruit and/or vegetable base mixture, a hydrocolloid and any optional additional ingredients and a heat and/or pressure process. The use of a fruit and/or vegetable paste enables an edible composition to be obtained that has an optimum balance of water and solid content, such that it has a unique texture while being ambient stable. In addition, a paste allows for the preparation of an edible composition that does not require or need the addition of refined sugar or artificial sweeteners.

I. Definitions

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred materials and methods are described below.

The term "fruit" refers generally to the edible portions of fruit, e.g. fruit flesh and edible fruit skins. The products according to the invention generally do not contain fruit seeds or stones having maximum dimension greater than about 2 mm nor do they generally contain thick fruit peels such mango peel or apple peel. In some embodiments the skin is removed from the fruit (e.g., mangos, bananas, apples, etc.). In some embodiments, the skin is not removed from the fruit (e.g., raspberries, strawberries, blueberries, etc.).

The term "vegetable" generally refers to any plant whose seeds, roots, tubers, bulbs, stems, leaves, or flower parts are used as food. It is used herein in the culinary sense rather than the botanical classification.

The term "fruit pulp" herein refers to a pulp obtained by comminuting a natural, fresh fruit. The pulp may comprise, or consist essentially of, a pulp that has been concentrated by evaporation or other means, or it may consist essentially of full moisture fruit pulp. Preferably, the fruit pulp consists essentially of comminuted fruit flesh. However, the pulp preferably has not been treated at a temperature above about 70° C., more preferably it has not been treated at a temperature above about 50° C., and most preferably it has not been treated with heat (i.e. it has been kept at ambient temperature or below. It will be appreciated that the fruit may have been frozen for storage and/or transport either before or after comminution to produce the pulp. Additionally, in various embodiments, fruit pulp may be the same as a fruit puree (as further detailed below), or alternatively is the starting material for the preparation of a fruit concentrate or a fruit paste.

Vegetable and nut pulps can be prepared in the same manner and can be utilized in any of the compositions described herein. For vegetables and nuts, only the edible portion is used, and the shell or inedible portions are separated as necessary prior to use in the edible composition.

Fruit puree is defined as chopped, homogenized fresh or frozen fruit in its natural composition. No additional components have been added. It can be prepared, for example, by blending fresh fruit or fruit pulp in a standard food processor or blender until homogeneous. The fruit may or may not include the skin of the fruit based up the identity of the fruit and the thickness of the skin. In some embodiments the skin is removed from the fruit pulp before blending (e.g., mangos, apples, bananas, etc.). In some embodiments, the skin is not removed from the fruit before blending (e.g., raspberries, blueberries, strawberries, etc.). Although the range may vary with the type of fruit being pureed, in various embodiments the fruit puree will typically have a water content of about 80%, about 85%, about 90%, about 95% or more, by weight (the water content ranging for example from about 80% to about 95%, or about 85% to about 95%); stated another way, the puree may have a solid (e.g., sugar) content of about 20 Brix, about 15 Brix, about 10 Brix, or less (the solids (e.g., sugar) content ranging for example from about 5 to about 20 Brix, or about 5 to about 15 Brix).

Vegetable and nut purees can be prepared in the same manner and can be utilized in any of the compositions described herein. For vegetables and nuts, only the edible portion is used, and the shell or inedible portions are separated as necessary prior to use.

Fruit paste is defined as a fruit puree with most of the water content removed. The water removal is done using methods generally known in the art (e.g., heat, evaporation, freeze drying, or any other standard method). Preferably, the water is removed under conditions which limit or prevent unwanted degradation (e.g., cooking) of the starting material. For example, in one particular embodiment water removal is achieved by means of freeze drying or heating under vacuum, so that little if any cooking of the starting material occurs. Although the range may vary, the fruit paste typically has a water content of about 30%, 25%, 20%, 15%, or less, by weight (the water content ranging for example from about 15% to about 30%, or about 20% to about 30%); stated another way, the fruit paste may have a solids (e.g., sugar) content of about 70 Brix, about 75 Brix, about 80 Brix, about 85 Brix, or more (the solids (e.g., sugar) content ranging for example from about 70 to about 85 Brix, or about 70 to about 80 Brix). Typically, the fruit paste has a consistency similar to that of thick dough. For example, Paradise Fruits by Jahncke (www.paradisefruits.co.uk) sells numerous fruit pastes including, but not limited to, raspberry, apple, mango, cherry and orange.

Vegetable and nut pastes (e.g., almond or peanut butter) can be prepared in a similar manner and may be utilized in any of the compositions described herein.

Fruit concentrate is intermediate between fruit puree and fruit paste, having a higher solids concentration/lower water concentration than a fruit puree but a lower solids concentration/high water concentration than a fruit paste, inasmuch as some of the water has been removed from the fruit puree using methods generally known in the art, thereby increasing the amount of dissolved solids and sugars. Typically, however, the water concentration will be less than 80%, and in some instances will be about 75%, about 70%, about 65%, or about 60% by weight (the water concentration ranging for example from about 60%, to about 75%, or about 65% to about 70%); stated another way, the fruit concentrate will typically have a solids (e.g., sugar) content of greater than 20 Brix, and in some instances will be about 25 Brix, about 30 Brix, about 35 Brix, or about 40 Brix (the solids (e.g., sugar) content ranging for example from about 20 to about 40 Brix, or about 25 to about 35 Brix). Many are commercially available. For example, TreeTop® (www.treetop.com) sells numerous fruit concentrates including, but not limited to, mango, apple, pear, and blueberry.

Vegetable and nut concentrates can be prepared in a similar manner and may be utilized in any of the compositions described herein.

"Shelf stable" refers to a product that can be stored at typical chill cabinet temperatures of about 7° C. for a period of at least 3 months, at least 6 months, at least 9 months, at least 12 months, or more without unacceptable deterioration of organoleptic properties or appearance, or without developing microbiological activity outside regulatory limits.

"Ambient stable" refers to a product that can be stored at typical ambient temperatures, such as 20-25° C. and 60% relative humidity, for a period typically of at least 3 months, at least 6 months, at least 9 months, at least 12 months, or more without unacceptable deterioration of organoleptic properties or appearance, or without developing microbiological activity outside regulatory limits.

A "high moisture" product is defined as having greater than 50% water content, and in some instances may have a moisture content of about 55%, about 60%, about 65%, about 70%, about 75%, about 80%, about 85% or more, by weight, but will typically have a moisture content within the range of about 55% to about 85%, or about 60% to about 80%. Additionally, or alternatively, the product may have a water activity of greater than 0.7, greater than 0.8, greater than 0.9, from about 0.7 to about 1, or some value in between this range (e.g., about 0.85, about 0.9, or about 0.95). Water activity (AW) is the partial vapor pressure of water in a substance divided by the standard state partial vapor pressure of water and expressed mathematically as AW=P/P0, where P is the vapor pressure of water in the substance, and P0 is the vapor pressure of pure water at the same temperature. In the field of food science, the standard state is defined as the partial vapor pressure of pure water at the same temperature.

An "intermediate moisture" product is defined as having between 15% and 50% moisture content by weight, and/or a water activity of from 0.4 to 0.8.

A "low moisture" product is defined as having less than 15% moisture content by weight, and/or a water activity below 0.4.

As is known in the art, low and intermediate moisture food products naturally inhibit the growth of bacteria, yeast and mold that are responsible for food spoilage. The possibility of spoilage directly affects the shelf life, storage stability, and storage conditions of a food product. For a food to have a useful shelf life without relying on refrigerated storage, it is necessary to control the pH, the water activity or a combination thereof. It is an advantage of the present invention to provide an edible composition with a water activity greater than 0.5 that is ambient stable. It is another advantage of the present invention to provide an edible composition with a water activity greater than 0.5 that is shelf stable.

The term "ultra-high pressure" refers to an isostatic pressure of at least about 200 MPa. Higher pressures are also included in this definition.

Heat processing is defined as the combination of temperature and time required to eliminate a desired number of microorganisms from a food product. The temperature may be generated by any suitable means including, but not limited to, electromagnetic radiation.

"Electromagnetic radiation" is defined so as to encompass the electromagnetic spectrum as is understood in the art. Examples of electromagnetic radiation include, but are not limited to, microwaves, radio waves, ultraviolet, and infrared. Devices that created focused electromagnetic energy are known in the art, for example a microwave oven.

"Commercial sterility" of thermally processed food, as defined by the US Food and Drug Administration, means the condition achieved—
  (i) By the application of heat which renders the food free of—
    (a) Microorganisms capable of reproducing in the food under normal nonrefrigerated conditions of storage and distribution; and
    (b) Viable microorganisms (including spores) of public health significance; or
  (ii) By the control of water activity and the application of heat, which renders the food free of microorganisms capable of reproducing in the food under normal non-refrigerated conditions of storage and distribution.

"Commercial sterility" of equipment and containers used for aseptic processing and packaging of food means the condition achieved by application of heat, chemical sterilant (s), or other appropriate treatment that renders the equipment and containers free of viable microorganisms having public health significance, as well as microorganisms of nonhealth significance, capable of reproducing in the food under normal nonrefrigerated conditions of storage and distribution.

The organoleptic properties of the edible composition are any properties that are associated with the taste (e.g., flavor), sight (e.g., color), smell (e.g., aroma), and/or touch (e.g., texture) of the final product.

II. Edible Composition

As described herein, this application relates to an edible composition, wherein said composition comprises a fruit and/or vegetable base material, and a hydrocolloid. Said composition is advantageously dimensionally stable, ambient stable for at least 12 months, has a moisture content greater than 50 wt. %, has a pH less than 4.5, has a water activity greater than 0.5, is commercially sterile, is free of artificial flavors, has a solids content greater than 10 wt. %, and does not exhibit syneresis. Additionally, the edible composition retains one or more of the organoleptic properties and/or nutritional values of the fruit and/or vegetable base material from which it is derived or prepared.

The edible composition may be prepared without the addition of refined sugar or artificial sweetener. However, in some embodiments, the edible composition further comprises one or more optional additives that are selected from an enzyme, an acidulant, a nutritional supplement, a sweetener, a divalent metal ion, an antioxidant, a coloring, a flavoring and/or combinations thereof. The final product is an edible composition suitable for packaging in single or multiple serving sizes.

Because this invention relates to edible compositions intended for human consumption, all ingredients, additives and other additions to any composition or used in any method are generally regarded as safe (GRAS) as designated by the United States FDA or FEMA GRAS as designated by the International Flavor and Manufacturing Association.

In some embodiments, the edible composition according to the present invention may be 100% organic as defined by the US Department of Agriculture, the European Commission or appropriate certifying organization. The products are preferably substantially or completely free of artificial food additives. In some embodiments the edible composition is 100% all natural ingredients.

As previously noted, the edible composition of the present invention advantageously has an optimal balance between water or moisture content and solid content, such that it has a unique texture and maintains one or more of the organoleptic and/or nutritional benefits of the fruit and/or vegetable from which it is derived or prepared. Typically, the edible composition has a moisture content of about 50%, about 55%, about 60%, about 65%, about 70%, about 75%, about 80%, about 85% or more, by weight, but will typically have a moisture content within the range of about 50% to about 85%, or about 60% to about 80%. However, it is understood that the edible composition will be within appropriate safe antimicrobial limits as determined the United States FDA, the European Commission or appropriately designated regulatory agency.

As previously noted, it should be recognized that the edible composition is in the form of a gelatinous, dimensionally stable solid that has a unique, desirable texture. In this regard, it should be noted that bloom is the measure of gel strength. It is the force, expressed in grams of force or Newtons, necessary to depress the surface of a gel by 4 mm with a standard 0.5" diameter cylindrical probe (AOAC TA-10 probe). When measuring a pure gelatin, a reference sample of the gel has a concentration of 6.67% and has been kept 17 hours at 10° C. The same method is applied to gelled compositions, but the concentration and testing conditions vary based on the application and nature of the composition. Gel strength increases with concentration and time as the gel matures. It decreases with temperature.

It some embodiments, the bloom of the edible composition may be greater than 250, greater than 300, greater than 400, or even greater than 500, or more. Alternatively, the edible composition may have a bloom typically between about 250 and 500, or about 300 and 400. In these or other embodiments, the gel will have texture strength as determined by standard compression testing typically greater than 500 g of force (4.9 N), greater than 1000 g of force (9.8 N), greater than 1500 g of force (14.7 N), greater than 2000 g of force (19.6 N), greater than 2250 g of force (22.1 N), or even greater than 2500 g of force (25.6 N). Alternatively, the edible composition may have a texture strength typically between about 500 and 2500 g of force, or about 1500 and 2500 g of force.

In some embodiments, the initial bite texture of the compositions will more closely resemble that of ripe fruit pieces compared to prior art fruit-based shelf stable compositions. Combined with the high moisture content and natural flavor of the product, this gives the consumer an experience more closely resembling the sensations of fresh fruit. In some embodiments, compositions of the present invention will exhibit an initial bite compression value of less than 5000 grams or less than 2500 grams or less than 1500 grams. In some embodiments, the composition will be formulated to have an initial bite compression value close to that of the corresponding fresh fruit. For example, a mango-flavored embodiment may be formulated to have an initial bite compression value similar to that of a piece of fresh mango. The resemblance of the initial bite texture of certain embodiments of the present invention to that of ripe fruit pieces can be demonstrated through measurements of compression force of the product. The following compression testing method was performed on fruit and fruit-based compositions:

Initial Bite Compression Testing Method

Remove samples from packaging (if applicable) and place on hard surface. Using a ¾ inch cork and rubber punch, cut out cylindrical samples. Adjust the height (thickness) to be about 10-11 mm with a straight razor. If samples were stored in non-ambient environmental conditions, allow samples to come to room temperature before testing. Samples need to be homogenous and able to conform to the sample requirements and dimensions.

Attach the 50 mm diameter aluminum cylindrical probe (P/50) to a Stable Micro Systems Ltd. Texture Analyzer TA.XT Plus. Using the Exponent Software, calibrate the force with a 2 kg weight, calibrate the height, and calibrate the frame stiffness to 3000 g for the 5 kg load cell and 45000 g for the 50 kg load cell.

Enter the sample dimensions into the parameters tab under Test Configuration. Make sure that the correct probe is selected (P/50; 50 mm DIA CYLINDER ALUMINUM) under the probe selection tab. Enter the following parameters into the TA settings menu:

Test Mode: Compression
Pre-Test Speed: 1.00 mm/sec
Test Speed: 1.00 mm/sec
Post-Test Speed: 1.00 mm/sec
Target Mode: Force
Force: 39 N (for 5 kg load cell) 400 N (for 50 kg load cell)
Trigger Type: Auto (Force)
Trigger Force: 0.049 N
Break Mode: Off
Stop Plot at: Start Position
Tare Mode: Auto
Advanced Options: On
Control Oven: Disabled
Wait for Temperature: No
Frame Deflection Correction: On-Multi Point
Place sample on the platform under the probe in the center. Bring the probe down close to the sample (but not touching the sample). Once the sample is in place, select TA from the menus and select "Run a Test". Once the sample is named and saved in the correction location, click start test at the bottom of the pop up screen. The Exponent Software will send the parameters to the texture analyzer and start running the test. The probe will move towards the sample at 1 mm/sec, and once the probe and sample reach a contact force of 0.049N (5 g), the data will start to be recorded. The probe will continue to move towards the sample until 39 N force is reached. Once that force is reached, the probe will move away from the sample at 1 mm/sec and return to the start position.

Exponent will produce a graph of Force (g) vs Time (sec). Peak forces (g) are extracted where there is a peak in the graph which relates to the point in which the gel or matrix structure breaks. The strain (%) is also extracted at this same point. The strain (%) is the percentage that the sample was able to be compressed before the gel or matrix breaks. If the sample does not "break", the 50 kg load cell will have to be used with a maximum target of 400 N. If the sample still does not "break" under 400 N, take the force at 50% strain. Typically 5-10 samples are required to understand the sample and the natural variability of the product.

As previously noted, the edible composition is advantageously shelf stable, ambient stable, or both. As a result, the present invention provides an edible composition that has many of the benefits or properties of the natural fruit and/or vegetable material from which it is derived or prepared, but it may be stored for a much longer period of time. For example, in various embodiments, it may be shelf stable, ambient stable or both for at least 3 months, at least 6 months, at least 9 months, at least 12 months, or more.

In one or more embodiments, fresh fruit is preferred for preparing the edible composition herein. However, previously frozen fruit, canned fruit, partially dehydrated fruit or rehydrated fruit, as well as frozen juices, concentrates, pastes, purees, nectars, powders, fruit byproducts, frozen juice pulps and combinations thereof are also suitable for use.

The present invention is applicable to a wide variety of fruits including, but not limited to, aaçai berries, apple, apricot, avocado, banana, blackberry, black currant, blueberry, boysenberry, cantaloupe, currant, cherry, cloudberry, coconut, cranberry, date, dragon fruit, elderberry, fig, goji berry, gooseberry, grapes, raisin, grapefruit, guava, huckleberry, jackfruit, jujube, juniper berry, kiwi, kumquat, lemon, lime, lychee, mandarin, mango, marion berry, melon, cantaloupe, honeydew, miracle fruit, mulberry, nectarine, olive, orange, blood orange, clementine, tangerine, papaya, passion fruit, peach, pear, persimmon, plum/prune, pineapple, pumpkin, pomegranate, pomelo, purple mangosteen, quince, raspberry, salmon berry, black raspberry, red currant, star fruit, strawberry, squash, tamarillo, tomato, ugli fruit, watermelon and mixtures thereof.

Cacao pulp is a by-product of cacao bean harvesting. It is a white mucilaginous layer, which firmly envelops individual seed of the fruit of Theobroma cacao plant. It is formed during pod development from endocarp meristem and makes up approximately 40% of fresh seed weight and about 10% of overall fresh pod weight.

Optionally, the base material may comprise cacao pulp in any suitable form, including, but not limited to, a puree, a concentrate, a liquor, a paste and any combination thereof.

While the present invention is primarily directed towards fruit containing products, the skilled artisan will appreciate that the present invention is equivalently applicable to all edible plant solids, including, but not limited to, vegetables and nuts.

In addition to fruit, some embodiments of the present invention are applicable to a large variety of nuts, including, but not limited to, almonds, cashews, chestnuts, coconuts, hazelnuts, macadamia, peanut, pecan, pine nuts, pistachio, walnut, and mixtures thereof.

In addition to fruits and nuts, some embodiments of the present invention are applicable to a large variety of vegetables, including, but not limited to, artichoke, arugula, asparagus, amaranth, beans, broccoli, Brussel sprouts, cabbage, carrots, cassava root, cauliflower, celery, chard, collard greens, eggplant, endive, kale, kohlrabi, legumes, lettuce, maize, mushrooms, mustard greens, spinach, okra, onions, parsley, peppers, pumpkin, radicchio, rhubarb, root vegetables, radish, spinach, squash, sweet potato, tomato, tubers, water chestnut, watercress, yucca root, zucchini, and combinations thereof.

The base material comprises the fruit and/or vegetable and/or nut material in the edible composition regardless of the form in which it is added, for example, but not limited to, pulp, puree, concentrate, paste or combinations thereof. In some embodiments, the edible composition comprises greater than 50% of the base material, greater than 60% of the base material, greater than 70% of the base material, greater than 80% of the base material, greater than 90% of the base material, greater than 95% of the base material, greater than 99% of the base material.

In some embodiments, the composition may comprise one or more fruits and/or vegetables and/or nuts.

The edible composition comprises a hydrocolloid. Useful hydrocolloids herein include, but are not limited to, pectin, agar, locust bean gum, carrageenan, guar gum, tamarind gum, starches, caseinate, xanthan gum, konjac flour, alginate, modified starches, tapioca, plant proteins, dairy proteins and mixtures thereof. Preferred hydrocolloids are selected from the group consisting of pectin, agar, locust bean gum, carrageenan, guar gum, tamarind gum and combinations thereof. The composition can comprise from about 0.5 wt. % to about 12 wt. % of the hydrocolloid, about 1 wt. % to about 8 wt. %, or about 2 wt. % to about 6 wt. %.

In some embodiments, the hydrocolloid may be pectin. As is known in the art, pectin has different degrees of esterification (DE) where the DE is expressed as a percentage of methyl esters present in relation to the whole. In some preferred embodiments, the pectin has a DE of less than 50 (LM—low methoxyl). In some embodiments the pectin has a DE of greater than or equal to 50 (HM—high methoxyl). In some embodiments, the LM pectin is amidated (LMA).

The pectin may be added to the composition as a dry powder, as a solution wherein the powder is dissolved in a suitable quantity of water, or a combination thereof. The appropriate pectin is selected based on the natural pectin present in the base material (i.e. the fruit, vegetable and/or nut material) in the base material and the desired organoleptic profile of the edible composition. Low methoxyl pectin is preferred in the present invention due to its ability to form crosslinked gels in high moisture (e.g. greater than 50% water) formulations.

In some preferred embodiments, the hydrocolloid may be agar. The basic material that is known as agar is derived from various genera and species of seaweeds in the class Rhodophyceae. The term agar as used in the present application includes all materials commonly so known in the art. Agar is commercially available and is furnished in the form of a dry powder or dried strips. In some embodiments, the agar may be added as a dry powder to the pulp while, in other embodiments, it may be hydrated prior to addition to the pulp. In some embodiments, a combination of dry powder agar and hydrated agar may both used. Many commercial formulations of agar are known in the art, and any agar composition suitable for use in food products is suitable for this application. Agar is a preferred hydrocolloid because it has been found to protect the natural color of the fruit component.

The present invention modifies the pectin or hydrocolloid present in the base material to form a gel. The pectins are demethoxylated by the action of added pectin methyl esterase under controlled conditions to produce demethoxylated pectins that form a gel with the water naturally present in the base material, and thereby bind it into a dimensionally stable gel matrix. A gel is dimensionally stable, and gel formation can be recognized, for example, by mechanical properties of the product. In particular, the product is semi-solid and dimensionally stable; typically a gel has a texture intermediate that of natural fruit flesh and jelly. Gel formation may also be recognized by thermal analysis, as the gel will have a melting point endotherm that is detectable by differential scanning calorimetry. By way of illustration and not limitation, a dimensionally stable solid holds its shape when removed from any packaging or outside structural support for an extended period of time.

As previously noted, the edible composition of the present invention is gelatinous. Fruit pulp contains endogenous pectin methyl esterase (PME) and polygalacturonase (PG) enzymes (a pectinase). The PME deesterifies the methoxy groups on the pectin chain to leave polygalacturonic acid. The carboxylate groups on the demethoxylated pectin crosslink through divalent metal ions, frequently calcium, resulting in gel formation. However, in some embodiments, when processed in accordance with the present invention, incubation of fruit pulp with the endogenous PME alone is insufficient to produce a dimensionally stable product suitable for consumption, packaging or handling. Therefore, in some embodiments, the mixture further comprises additional enzymes.

In some embodiments, the edible composition according to the present invention comprises the addition of additional enzymes, especially pectin methyl esterase (PME), to the pulp. The added PME can be obtained from various sources, including plants, bacteria or fungi. One PME obtained from a generally recognized as safe (GRAS) strain of *Aspergillus niger* is commercially available. Another preferred source of PME is fruit or vegetable pulps that are especially rich in PME, for example tomato pulp. The use of fruit or vegetable pulps as a source of PME reduces the number of additives in the mixture and makes possible the preparation of a 100% fruit and/or vegetable and/or nut edible composition. PME may be added in an amount sufficient to achieve a concentration in the mixture used to prepare the edible composition such that it is present in an amount of from about 0.05 wt. % to about 1.0 wt. %, from about 0.3 wt. % to 0.5 wt. %. The amount of PME may be optimized based on the amount of endogenous enzyme and hydrocolloid present in the fruit and/or vegetable and/or nut base material and the desired organoleptic profile of the edible composition.

Syneresis is the expulsion of water from the matrix of a gel. It is caused by the slow collapse of the gel matrix which decreases the dimensions of the gel and increases the concentration of components in a system. Syneresis in a closed package in a food product is undesirable from both the perspective of consumer appeal, and the health and safety of the edible composition. As such, it is an advantage of the present invention to provide an edible composition that exhibits little, and preferably no, syneresis, particularly when stored at ambient conditions for an extended period of time (e.g., for at least 3 months, at least 6 months, at least 9 months, at least 12 months, or more).

In some embodiments, additional flavorings may be added to give the edible composition a suitable organoleptic profile. The flavor may come from natural sources in any physical form, including, but not limited to, a solid, a powder, an oil, a liquid, a concentrate, a paste, a puree, or any combination thereof. The flavor is any flavor used in food products. The amount of flavoring is determined empirically based on the desired organoleptic profile of the edible composition. In some embodiments, the flavoring is the same type as the base material. In some embodiments, the flavoring is different from the base material. In some embodiments of the edible composition no additional flavoring is added.

In some embodiments, additional coloring may be added to the composition. Typically, the color may be selected so as to give the final product a color that is most closely associated with the fruit and/or vegetable and/or nut base material from which is derived or prepared. In other embodiments, the color is selected to impart a specific color to the edible composition based on specific criteria, such as, but not limited to, product marketing or consumer appeal. In some embodiments of the edible composition no additional coloring is added.

The fruit pulp may further comprise a divalent metal ion added in the form of a salt. Without being limited to any particular theory, it is believed that some metal salts promote gel formation of the hydrocolloid, especially pectin. One suitable divalent metal ion is calcium, for example, in the form of calcium chloride, calcium acetate, calcium lactate, calcium lactate gluconate, calcium ascorbate or combinations thereof. Calcium lactate is preferred. The addition of a divalent metal ion salt is not necessary in all embodiments. For example, mango contains sufficient endogenous calcium for satisfactory gel formation without the addition of divalent metal ion salts. On the other hand, the addition of calcium salts may be used to achieve satisfactory gel formation of apple pulp. Where present, the divalent metal ion salt is typically added in an amount (as $Ca^{2+}$) of from about 0.05 wt. % to about 3 wt. %, from about 0.05 wt. % to about 0.4 wt. %, from about 0.2 wt. % to 0.4 wt. %.

The edible composition according to the present invention optionally further comprises the addition of an acidulant. An acidulant may be an edible organic acid added in sufficient amounts to provide the composition with a pH of about less than 4.5, less than 4.2, less than 4.0, or less than 3.7. The particular pH selected from within this pH range may depend in part upon the type of hydrocolloid employed, the nature of the pulp used, and/or the organoleptic profile desired in the edible composition. For example, satisfactory results may be obtained when the edible organic acidulants are employed at levels ranging from about 0.1 to 1.0 wt. %, preferably about 0.1 wt. % to about 0.6 wt. %, and most preferably from about 0.2 wt. % to about 0.4 wt. %.

A variety of edible organic acids can be used as the acidulant to adjust the pH of the edible composition as well as to modify the taste and tartness of the edible composition. Examples of suitable acids for use herein include, but are not limited to, acetic acid, citric acid, tartaric acid, malic acid, lactic acid, fumaric acid, ascorbic acid and mixtures thereof, especially in the form of the sodium, potassium and/or calcium salts thereof. In addition to providing a desired tartness to the flavor, such acidulants may affect the ability of the hydrocolloid to form a gel.

Although the edible composition in various embodiments advantageously has no refined sugar or other sweeteners (e.g., artificial sweeteners) added, in some embodiments, the edible composition may further comprise supplemental sweeteners such as, but not limited to, saccharine, aspartame, thaumatin, potassium acetylsulfame, sucralose, and mixtures thereof without departing from the scope of the invention. Other suitable sweeteners that become permitted for use or commercially available from time to time can also be used. In some embodiments, the amount of the sweetener is determined empirically based on the desired organoleptic profile of the edible composition.

In certain embodiments the edible composition may further comprise an antioxidant to promote stability. A suitable antioxidant is ascorbic acid, which may also function as an acidulant or nutritional supplement. Preferably, the antioxidant is present in an amount of from about 0.1 wt. % to about 4 wt. %, preferably from about 0.1 wt. % to about 2 wt. %, based on the total weight of the pulp. The ascorbic acid may be derived from natural fruit in the pulp.

As is known in the art, many vitamins and minerals are heat labile and decompose quickly upon heating or cooking. Accordingly, the present methods and compositions advantageously permit the incorporation of nutritional supplements, especially nutritional supplements that are heat labile. The nutritional supplements include, but are not limited to, vitamin A, vitamin C (ascorbic acid), vitamin B1 (thiamine), vitamin B2 (riboflavin), vitamin B3 (niacinamide), vitamin B5 (pantothenic acid), vitamin B6 (pyridoxine HCl), vitamin B12 (cobalmin), vitamin D (cholecalciferol), vitamin E, vitamin K (phytonadione), biotin, choline, niacin, folic acid, calcium, chromium, copper, ginseng, and combinations thereof. In some embodiments, a nutritional supplement can serve as an additive in another category simultaneously. For example, ascorbic acid is an acidulant, antioxidant, and a nutritional supplement.

III. Packaging

The edible composition may be packaged in any suitable material for maintaining it in ambient stable and/or shelf stable condition for at least 3 months, at least 6 months, at least 9 months, at least 12 months, or more. A portion of the packaging may be transparent to allow inspection of the package contents. The packaging is substantially impermeable to microorganisms, and it is also substantially impermeable to gases such as oxygen, in order to maintain the freshness of the product. Preferably, the packaging is substantially oxygen-impermeable. For example, suitable packaging materials have an oxygen permeability at 23° C. and 50% relative humidity less than about 2 $cm^3/m^2$/day at 1 atm pressure. Suitable packaging films include, but are not limited to, oxygen barrier laminates such as C5045 Cryovac, and oxygen scavenging films.

The packaging may, for example be in the form of a container having rigid walls such as a glass or plastic jar or cup. Alternatively, the package may be a flexible pouch. The term "flexible pouch" refers to a closed container formed substantially or completely of a flexible sheet material. The sheet material normally comprises at least one continuous layer of thermoplastic film, or it may be a laminated sheet made up of more than one thermoplastic film layer. The sheet material making up the pouch may optionally further comprise a metal layer, such as an aluminum layer, to render the material oxygen-impermeable and to provide aesthetic effects.

The finished products may be formed into any suitably sized and shaped pieces. In some embodiments, the pieces are individually packaged as single serving products. Individual single servings vary in size but, in one or more embodiments may be between about 100 and about 120 g each. The edible composition may be placed or prepared inside of suitable packaging to minimize moisture gain or loss during extended storage at either shelf (less than about 7° C.) or ambient temperature (e.g., about 20-25° C.). Suitable packaging includes, but is not limited to, pouches fabricated from flexible packaging film or vacuum sealed single serve plastic cups.

In some embodiments, the packaging will be stable and safe to electromagnetic radiation processing, especially microwave processing. As such, the package is free of any material (e.g. an aluminum layer) which would be unsuitable for microwave exposure. Such packaging is known in the art and commercially available.

In some embodiments, the packaging may be a single or multiple serving size cup or flexible pouch that is stable to pressure and/or microwave processing. The mixture can be loaded into the cup or pouch, which is then vacuum sealed prior to processing. In some embodiments, the mixture may be processed under microwave conditions in either a batch or continuous flow process and then packaged into single or multiple serving-size cups or pouches.

The mixture from which the edible composition is prepared (as further detailed below) may be filled into the container in conventional filling or form-fill-seal equipment. The equipment may be adapted to fill the container with regions of two or more different edible composition mixtures. For example, two different edible composition mixtures may be filled into the container through concentric filling tubes in similar fashion to so-called "one-shot" confectionery molding methods in order to provide a product having a shell of a first edible composition and a core of a second edible composition. Alternatively, two or more different edible composition mixtures may be filled into a package spatially separate from one another in a side-by-side or layered manner.

As previously noted, the body of an exemplary package may comprise or consist essentially of a pouch of flexible sheet material. The pouch may, for example, be a so-called pillow pouch, typically formed by continuous form-fill-seal equipment, or the pouch may be formed by bonding together front and back faces of flexible sheet materials around their marginal edges. In certain embodiments, the pouch may be a stand-up pouch; that is the pouch may be formed by bonding together front and back faces of sheet material around three edges, with a gusset sheet inserted and bonded to the respective fourth edges of the front and back sheets to form a base for the pouch. The total thickness of each flexible wall of the pouch may be, for example, in the range of from about 50 micrometers to about 1000 micrometers, for example from about 100 micrometers to about 500 micrometers.

The pouch may be provided with a nip and/or a line of weakness and/or a tear strip to allow the pouch to be opened more easily after filling. The volume of the edible composition in the package may range in various embodiments from about 20 ml to about 1000 ml, from about 30 ml to about 300 ml, from about 50 ml to about 250 ml. This volume may be appropriate for containing an individual portion of the edible composition suitable for consumption by one person. Typically, the edible composition substantially fills the package.

Packaging of the mixture from which the edible composition is prepared may occur either prior to or after the pressure and/or heat process. In some embodiments, the mixture is placed in packages which are suitable for the subsequent processing, sealed, and then processed in a pressure and/or heat process. In some embodiment, the mixture is processed by a pressure and/or heat process and packaged thereafter. In some embodiments, the processed mixture is cooled prior to packaging. In some embodiments, the processed mixture is packaged before cooling.

IV. Method of Preparation

In general, the various ingredients as set forth above, including a suitable source of fruit and/or vegetable base material (e.g., a pulp, paste, puree, and/or concentrate) is mixed with a suitable hydrocolloid, and then subjected to a suitable pressure and/or heat process that does not undesirably alter (e.g., cook) one or more of the organoleptic properties and/or the nutritional value of the base material. In one embodiment, the source of the base material is a fruit and/or vegetable paste. In one or more of these embodiments, the present invention is additionally directed to the preparation of an edible composition as describe above. The mixture is exposed to a pressure and/or heat process, for example, but not limited to, microwave or ultra-high pressure conditions, to provide the edible composition. Such process will render the edible composition commercially sterile. The composition may be packaged either before or after processing. The final product is an edible composition suitable for packaging in single or multiple serving sizes.

In accordance with the present process, in some embodiments, the base material (e.g. fruit and/or vegetable and/or nut) is comminuted to a pulp. Any fruit and/or vegetable and/or nuts as described above is encompassed herein. As is known in the art, the skin of a fruit, vegetable or nut may or may not be edible or favored by consumers of the edible composition. In some embodiments the skin of the base material is removed before comminuting. In other embodiments the skin of the base material is not removed before comminuting. The pulp may be comminuted into a substantially smooth puree or it may be a more loosely chopped pulp (e.g. containing, for example, pieces larger than about 1 mm maximum dimension, for example, pieces having maximum dimensions of from about 1 mm to about 5 mm). The resulting comminuted material may be a mixture of smooth puree and larger pieces. The inclusion of some fruit pieces in the puree provides a non-uniform or granular texture in the edible composition that may be preferred by consumers. Preferably, the pulp is a whole pulp wherein none of the components of the flesh of the base material are removed before subsequent processing steps. In some embodiments, the moisture content of the comminuted material is substantially the same as the moisture content of the fruit and/or vegetable from which it was obtained.

Typically, fresh fruit pulp has a water content of at least 50 wt. %, least 60 wt. %, least 70 wt. %, at least 80 wt. %, at least 90 wt. % water. As is recognized in the art, different fruit, nut and vegetable pulps and purees will have a different moisture composition. In some embodiments, the water content of the pulp may be reduced by methods known in the art, including for example, but not limited to, evaporation, heating and/or reduced pressure, under conditions that will not have an unwanted effect on the organoleptic properties of the edible composition.

Typically, the step of comminuting the base material to form the pulp is performed at temperatures below about 50° C., or below about 40° C. (e.g., at ambient temperature). Conditions are selected such as to substantially retain most or all of the natural organoleptic profile and/or nutritional value of the fruit and/or vegetable base material.

The process according to the present invention further comprises the addition of a hydrocolloid to the base material of the comminuted fruit and/or vegetable and/or nuts. Specific hydrocolloids are described elsewhere herein. The composition typically includes the hydrocolloid from about 0.1 wt. % to about 12 wt. %, about 0.2 wt. % to about 8 wt. %, or about 0.5 wt. % to about 6 wt. %. The amount of hydrocolloid in the mixture may be determined based on, for example, the pH of the base material, the method of processing, the water content of the mixture, and/or the desired organoleptic profile of the edible composition.

In some embodiments, the mixture may be prepared comprising, or alternatively consisting essentially of, a pulp, a puree, a paste, and/or a concentrate (as defined herein) of the base material in combination with the hydrocolloid and optionally one or more additional ingredients detailed herein. Any fruit and/or vegetable and/or nuts as described above or included in the Examples below is encompassed herein. In one or more embodiments, the mixture comprises, or consists essentially of, about 20-40 wt. % of a fruit paste, or about 25-30 wt. % of a fruit paste, and about 60-75 wt. % of a fruit puree, with the balance being made up other optional ingredients recited herein. In another embodiment, the mixture comprises, or consists essentially of, about 40-80 wt. % of a puree, or about 45-75 wt. % of a puree, and about 20-45 wt. % of a concentrate, or about 25-30 wt. % of a concentrate, with the balance being made up of hydrocolloid and other optional ingredients recited herein. In yet another embodiment, the mixture may comprise, or consist essentially of, about 75-95 wt. % of a puree, with the balance being made up of hydrocolloid and other optional ingredients recited herein.

The process according to the present invention optionally further comprises the addition of an enzyme, and more particularly PME, to the pulp. As previously noted PME is commercially available and/or may be present in the fruit and/or vegetable material. If added to the mixture, the amount may be selected to optimize gel formation, the texture and/or the organoleptic profile of the edible composition. Typically, from about 0.05 wt. % to about 1.0 wt. %, or about 0.3 wt. % to 0.5 wt. %, may be added.

In some embodiments, additional optional ingredients may be added to the fruit and/or vegetable base material and hydrocolloid prior to comminuting as previously noted. These optional ingredients may be selected from the group consisting of an enzyme, an acidulant, a flavoring, a spice, a coloring, a sweetener, an antioxidant, a nutritional supplement and/or combinations thereof. The mixture may consist or consist essentially of the recited ingredients. These optional ingredients are described elsewhere herein and are typically selected to give the edible composition a specific organoleptic profile and/or nutritional benefit. Alternatively, one or more of these optional ingredients may be added after comminuting to form a mixture just prior to exposing the mixture to the pressure and/or heat process.

The process according to the present invention comprises blending the ingredients into a smooth or semi-smooth mixture prior to processing under a pressure and/or heat process, typically, for example, ultra-high pressure (UHP) or electromagnetic radiation. Blending is done in an apparatus of appropriate size ranging from a standard commercial food processor or blender to prepare, for example prototype or pilot batches, to a large industrial scale high-shear blender (e.g. production and commercial batches). These techniques are well known in the art.

Pectinase enzymes (specifically PG) depolymerize pectin chains, and in particular, they depolymerize the demethoxylated pectin chain in a fruit pulp. It is an advantage of the present invention that the application of either an ultra-high pressure or an electromagnetic energy process has the effect of at least partially inactivating the endogenous PG in the fruit pulp. The presence of PG enzymes in the final composition may give rise to syneresis which is unfavorable in product formulation.

The conditions for either the pressure and/or heat processing of the mixture are generally selected in order to inactivate spoilage enzymes such as peroxidase and PG. Although PME is more resistant to heat and pressure, it has been found, surprisingly, that it is not necessary to inactivate the PME in order to achieve a fully ambient stable product. Accordingly, in some embodiments, the process according to the present invention does not comprise additional stabilizing steps after the pressure and/or heat treatment. In this regard, it should be noted that packaging the edible composition after exposure to the pressure and/or heat treatment is not considered an additional stabilizing step.

Regardless of method by which the mixture is processed, (i.e. exposure to heat and/or pressure conditions), in some embodiments, the bloom of the edible composition may be greater than 250, greater than 300, greater than 400, or even greater than 500, or more. Alternatively, the edible composition may have a bloom typically between about 250 and 500, or about 300 and 400. In these or other embodiments, the gel will have texture strength typically greater than 500 g of force (4.9 N), greater than 1000 g of force (9.8 N), greater than 1500 g of force (14.7 N), greater than 2000 g of force (19.6 N), greater than 2250 g of force (22.1 N), or even greater than 2500 g of force (25.6 N). Alternatively, the edible composition may have a texture strength typically between about 500 and 2500 g of force, or about 1500 and 2500 g of force.

A. Heat Processing

In some embodiments, the mixture comprising the base material, the hydrocolloid, and optional additional additives is processed under heat conditions to achieve commercial sterilization. This may lead to demethoxylation of the natural fruit and/or vegetable pectin which may lead to gel formation while simultaneously forming a commercially sterile edible composition. Such techniques are known in the art. In a preferred embodiment the heat process is electromagnetic radiation, especially, but not limited to, microwave radiation.

As is known in the art, microwave processing of foods can result in pasteurization and/or sterilization. It is also used for cooking, drying and preservation of food material. Microwave treatment has the ability to achieve destruction of microorganisms at temperatures lower than that of conventional pasteurization due to significant enhancement or magnification of the thermal effects. It also has a number of quantitative and qualitative advantages over conventional heating techniques. One important advantage in the present application is that the application of microwave radiation to the mixture comprising the base material, the hydrocolloid, and optional additional ingredients may achieve sterilization of the composition without cooking the mixture.

Another advantage of microwave processing is the location of heat generation which is the product itself. The effect of small heat conductivities or heat transfer coefficients is eliminated. Therefore, larger quantities can be heated in a shorter time and with a more even temperature distribution. The shorter time that the mixture is heated prevents it from cooking, or more generally, prevents the undesirable degradation of the organoleptic properties and/or nutritional value of the fruit and/or vegetable base material from which the edible composition is prepared.

Another advantage to microwaves is the rate in which the base material is heated. The temperature of a microwave heated material increases at a much greater rate than a conventionally heated material. This reduces the time the material spends at higher temperatures. The shorter heating time and the shorter time at higher temperature reduces the undesirable degradation of the organoleptic properties and/or nutritional value of the fruit and/or vegetable base material from which the edible composition is prepared. This may improve the organoleptic profile and/or nutritional value of the edible composition by preventing the composition from cooking which may in turn improve the consumer appeal of the edible composition.

Exposure to electromagnetic radiation may be done, for example, in either a continuous flow or batch process. In a continuous flow process, the mixture comprising the base material, the hydrocolloid, and any additional optional ingredients is pumped into the applicator or apparatus at a rate such that the exposure of the mixture to the electromagnetic radiation is homogenous, consistent and sufficient to sterilize. The pumping rate may be adjusted to achieve proper exposure while minimizing processing time. In some embodiments the exposure to electromagnetic radiation may be from about 5 seconds to about 10 minutes; from about 15 seconds to about 5 minutes, or from about 20 seconds to about 1 minute. The composition and flow rate of the mixture, as well as the power of the energy source would determine the optimal exposure time of the edible composition.

In a batch process, the mixture may be placed inside the electromagnetic energy source and exposed to electromagnetic radiation for a predetermined amount of time, which is sufficient to sterilize the mixture. The mixture may optionally be placed inside a separate container that is placed inside the electromagnetic energy source. The predetermined amount of time may be based, for example, on the size of the batch, the power of the energy source, and the composition of the mixture.

Additionally, in some embodiments, the mixture is packaged into single-serving or multi-serving packages prior to batch processing. The packaging material will be safe and stable to electromagnetic radiation, especially safe to microwave processing.

In some embodiments, after exposure to the electromagnetic radiation either from a batch or continuous flow process, the exposed mixture is cooled enough to be handled safely. In some embodiments, the exposed mixture is packaged while still hot and gel formation occurs inside of the package. In other embodiments, the exposed mixture is permitted to cool, and gel formation occurs prior to packaging.

B. Pressure Processing

In some embodiments, the mixture comprising the base material, the hydrocolloid, and any additional optional ingredients is processed under pressure to achieve gel formation. The combination of the pressure and adiabatic temperature increase may be sufficient to commercially sterilize the mixture. In some embodiments, the process is carried out under ultra-high pressure (UHP). The term "UHP" refers to an isostatic pressure of at least about 200 MPa. In some embodiments the pressure is from about 300 MPa to about 690 MPa, or from about 350 MPa to about 600 MPa, but higher pressures can also be used. Methods for the UHP treatment of an edible composition are described, for example, in U.S. Pat. No. 8,586,121, which is fully incorporated by reference herein.

Apparatus for performing UHP treatment of foodstuffs are well known. Suitable equipment is, for example, available from Avure Technology Inc. of Seattle, Wash., Flow International Corp., Kobe Steel, Amahe S A of Spain, and Engineered Pressure Systems (Mass, US and Belgium).

The pressure and duration of the UHP treatment is generally sufficient to commercially sterilize the mixture and typically may be from about 1 minute to about 30 minutes, from about 2 minutes to about 15 minutes, or from about 4 minutes to about 10 minutes.

In some embodiments the mixture is placed in single or multiple serving packages that are stable to the pressure conditions, sealed, and exposed to pressure. In other embodiments, the mixture is exposed to pressure followed by packaging.

The application of UHP to the products causes an adiabatic temperature rise in the material under pressure. The magnitude of this temperature rise depends on the pressure, but is typically about 10° C. to 15° C. for a pressure of 400-500 MPa. The resulting peak temperature of the product is referred to as the peak pressurization temperature. The temperature increase is such that the adiabatic temperature rise is not sufficient to cause undesirable degradation of the organoleptic profile of the mixture from which the edible composition is prepared, and more specifically, is not sufficient to cook the mixture. The temperature of the mixture may subsequently fall during the pressurization treatment due to heat loss through the walls of the pressure vessel. See FIGS. 1 and 2 for typical pressure and temperature profiles of a mixture processed under UHP conditions.

Exemplary UHP conditions are: vessel temperature about 30° C., pressure about 400 MPa (which leads to a maximum processing temperature of about 40° C., due to the adiabatic heating), and duration about 5 minutes. However, these conditions may be varied based on the composition of the mixture to achieve optional gel formation and commercial sterilization of the edible composition.

The food products of the present invention are preferably placed in single serving packages. The packaging process may be an aseptic packaging process in which previously sterilized product is transferred to sterile package containers under sterile conditions. The sterile package is then sealed to prevent contamination. Alternatively, a hot fill process may be employed in which sterile, hot product is transferred to a non-sterile container. The heat of the composition serves to sterilize the packaging in such a process.

The invention is illustrated by, but not limited to, the following Examples.

EXAMPLES

Example 1. Mango Confection Produced in a Batch Microwave Method

A packaged fresh mango confection was prepared as follows (Example 1): ripe mango was peeled, stoned and chopped into a coarse product (68.43 wt. %, 1.5 kg). PARADISE® mango paste (78 brix) (27.24 wt. %), unipectin LM (CARGILL® PG225C) (3.09 wt. %), mango flavor (0.33 wt. %), ascorbic acid (0.20 wt. %), calcium lactate (0.36 wt. %), and pectin methyl esterase (NOVOSHAPE) (0.36 wt. %) were added, and the mixture was blended into a smooth paste.

The blended mixture was placed in a microwave suitable pressure cooker and heated at full power (1000 W kitchen microwave) for six to seven minutes. The pressure cooker was cooled enough to safely open. The still warm composition was immediately transferred into suitable, single serving plastic cups (100 to 120 g per package), sealed and cooled to ambient temperature.

Example 2-5. Mango-Apple Confections Produced by a Continuous Flow Microwave Method Packaged, fresh mango-apple confections were prepared as follows: the ingredients (approximately 0.7 kg scale) as illustrated in Table 1 were combined and blended into a homogeneous, pumpable mixture. The mixture was pumped through a continuous flow, Aseptia, Inc. microwave system as described in U.S. Pat. No. 8,574,651, which is fully incorporate by reference herein, with a single heating time period of 33 seconds. The final composition was packaged in single-serve packages (100 to 120 g per package), sealed and cooled to ambient temperature.

TABLE 1

Mango-Apple Confection Recipes Prepared by a Continuous Flow Microwave Method

| Ingredients | Example 2 | Example 3 | Example 4 | Example 5 |
| --- | --- | --- | --- | --- |
| Fresh mango puree (yellow variety) | 68.43 | 67.95 | 68.29 | 70.25 |
| Paradise ® Apple Paste (78 brix) | 27.24 | 29.46 | 27.20 | 28.33 |
| Cargill ® Unipectin LM, PG225S | 3.09 | — | 3.09 | — |
| Mango flavor | 0.33 | 0.39 | 0.42 | 0.42 |
| Ascorbic acid | 0.20 | — | 0.20 | 0.20 |
| Calcium Lactate | 0.36 | — | 0.40 | 0.40 |
| Novoshape PME | 0.36 | — | 0.40 | 0.40 |
| Agar | — | 2.20 | — | — |

All values are in weight % of the whole.

Examples 6-8. High Moisture Confections Produced in a UHP Method

Figure 2:
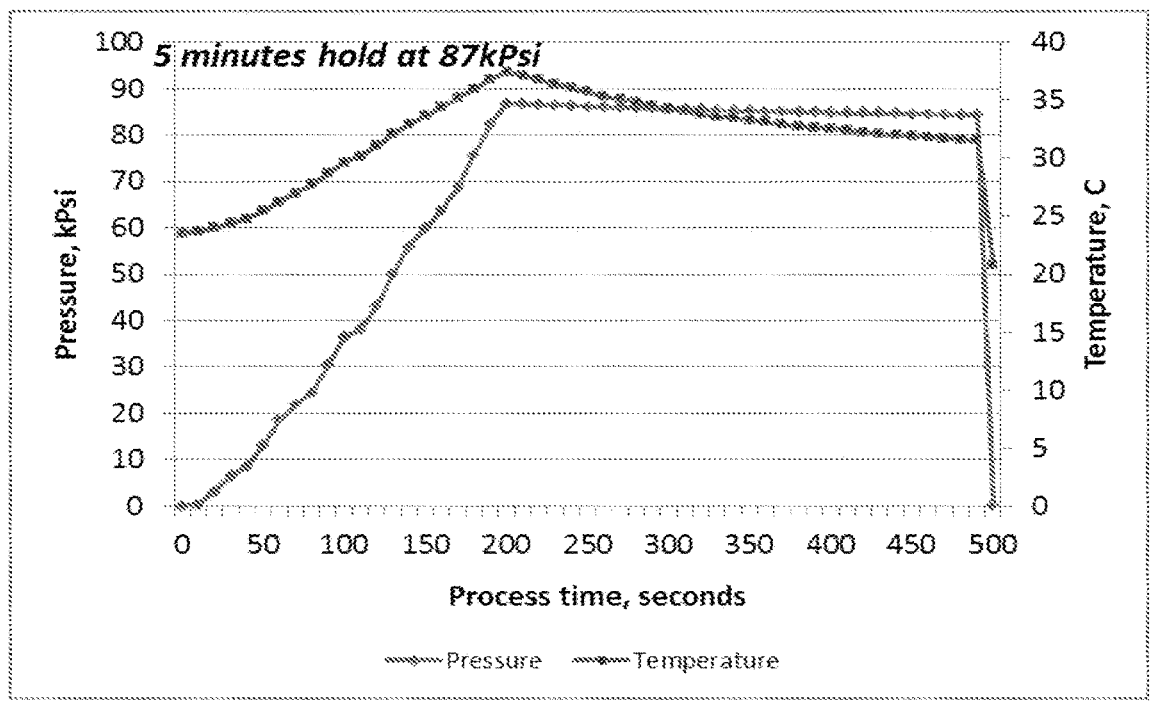
FIG. 2 is a graph of the pressure and temperature profile of a mango based edible composition prepared under UHP conditions for 5 minutes at 600 MPa.

Packaged fresh mango confections were prepared as follows: the ingredients as illustrated in Table 2 below, were combined and blended into a homogeneous mixture. The mixture was packaged in single serving clear packages and vacuum sealed. The packages were then subjected to ultra-high pressure in a 2L Avure Technologies UHP unit for from 5 to 10 minutes at approximately 600 MPa (87,000 psi). The temperature and pressure profile were monitored and representative examples are shown in FIGS. 1 and 2. Similar edible compositions were prepared using oranges and strawberries (ingredient list not shown).

TABLE 2

Mango Confection Recipes Prepared in a UHP Method

| Ingredients | Example 6 | Example 7 | Example 8 |
|---|---|---|---|
| Fresh mango puree (yellow variety) | 48.95 | 74.02 | 48-50 |
| Agar (GS 900 from Prinovac ®) | 1.71 | 3.06 | 1.4-1.7 |
| Deionized Water | 24.47 | — | 24-26 |
| Treetop ® mango concentrate (28 brix) | 24.47 | — | 24-26 |
| mango flavor | 0.39 | 0.40 | 0.2-0.4 |
| Snopac Apple Juice Concentrate | — | 22.53 | — |

All values are in weight % of the whole.

The vitamin preblend without zinc was prepared for these examples and contains the following: Ascorbic Acid (71.967%), EDTA Ferric Sodium Salt (22.000%), Niacinamide (2.672%), Vitamin A Palmitate 250,000 IU/g (1.400%), Pyridoxine HCl (0.547%), Vitamin D3 100,000 IU/g (0.528%), Thiamin HCl (0.316%), Riboflavin (0.274%), Vitamin B12 (1.0% 0.170%), and Folic Acid (0.126%). All nutritional supplements were sourced from DSM at www.dsm.com.

The vitamin preblend with zinc was prepared for these examples and contains the following: Ascorbic Acid (63.748%), Edta Ferric Sodium Salt (19.383%). Zinc Gluconate (11.555%), Niacinamide (2.354%), Vitamin A Palmitate 250,000 IU/g (1.233%), Pyridoxine HCl (0.482%), Vitamin D3 100,000 IU/g (0.465%), Thiamin HCl (0.278%), Riboflavin (0.241%), Vitamin B12 (1.0% 0.150%), and Folic Acid (0.111%). All nutritional supplements were sourced from DSM at www.dsm.com.

Samples were analyzed for nutritional value and microbial contamination. The results are shown in Table 4 below. As can be seen from the analysis, all samples prepared under UHP or microwave conditions maintained a significant nutritional value under the processing methods disclosed herein. Additionally, all samples tested negative for *Listeria monocytogenes*, and *Salmonella*.

TABLE 4

Nutritional Analysis for Example Edible Compositions

| | Nutritional Analysis | | | | | | | | | |
|---|---|---|---|---|---|---|---|---|---|---|
| Example ID/Results | M.C. % | Calories (Cal/100 g) | Carbs/ % | Dietary fiber % | Vit C mg/100 g | Vit A IU/100 g | Vit D3 IU/kg | Zinc | Iron | Na/ ppm |
| UHP: LM/PME | 63.1 | 150 | 34.4 | 11.8 | 223.3 | 260 | 143 | — | — | 2330 |
| UHP: Agar | 80.2 | 80 | 18.9 | 2.6 | — | 3200 | 319 | — | — | 47.5 |
| UHP: LM/PME + Zinc + Iron | 63.4 | 140 | 34.3 | 5.5 | 304.4 | 630 | — | 37.5 | 68.8 | 2330 |
| UHP:LM/PME + Iron | 62.8 | 150 | 35.2 | — | 307.8 | 540 | — | — | 79.1 | 2370 |
| Example 1 | 61.7 | 150 | 35.9 | — | 174.1 | 400 | — | — | — | 2580 |
| Example 11 | 74.4 | 100 | 23.3 | — | 302.8 | 1400 | 609 | 65.8 | 53.6 | 2100 |
| Example 12 | 74.3 | 100 | 23.3 | — | 325.6 | 4400 | 599 | — | 81.2 | 2380 |

Examples 9-12 High Moisture Mango Confections

Pilot batches were prepared on approximately 1.2 kg scale using the method as described in Example 1 (batch microwave method) according to the formulas in Table 3.

TABLE 3

High Moisture Mango Confection Recipes Prepared by the Batch Microwave Method.

| Ingredients | Example 9 | Example 10 | Example 11 | Example 12 |
|---|---|---|---|---|
| Fresh mango puree (yellow variety) | 60.85 | 50.85 | 60.64 | 60.64 |
| Treetop ® mango concentrate (28 brix) | 34.81 | 45.81 | 34.75 | 34.75 |
| Cargill ® unipectin LM, PG225S | 3.09 | 2.09 | 3.09 | 3.09 |
| calcium lactate | 0.36 | 0.36 | 0.36 | 0.36 |
| Novoshape ® PME | 0.36 | 0.36 | 0.36 | 0.36 |
| mango flavor | 0.33 | 0.33 | 0.33 | 0.33 |
| ascorbic acid | 0.20 | 0.20 | 0.20 | 0.20 |
| vitamin preblend w/Zn | — | — | 0.28 | — |
| vitamin preblend w/o Zn | — | — | — | 0.28 |

All values are in weight % of the whole.

Example 13-14. Cacao Confections

Prototypes were prepared on approximately 0.5 kg scale using the method as described in Example 1 according to the formulas in Table 5.

TABLE 5

Cacao Confection Recipes

| Ingredients | Example 13 | Example 14 |
|---|---|---|
| Frozen (defrosted) cacao puree | 96.55 | 96.19 |
| Cargill ® Unipectin LM, PG225S | 3.45 | 3.10 |
| Calcium Lactate | — | 0.36 |
| Novoshape ® PME | — | 0.36 |

All values are in weight % of the whole.

Examples 15-16. Cacao Combination Confections

Prototypes were prepared on approximately 0.5 kg scale using the method as described in Example 1 according to the formulas in Table 6.

TABLE 6

Cacao Combination Confection Recipes

| Ingredients | Example 15 | Example 16 |
|---|---|---|
| Cacao puree | 97.60 | 36.71 |
| Agar | 2.00 | 1.71 |
| Grape-fruit natural flavor (WONF TAK-660987) | 0.40 | — |
| Mango natural flavor (WONF TAK-660957) | — | 0.40 |
| Mango puree (frozen chunks) | — | 36.71 |
| Treetop mango puree concentrate (28 brix) | — | 24.47 |

All values are in weight % of the whole.

Texture and Gel Strength Measurements

The relative gel strengths of products made by UHP and microwave processing were determined as follows: the mixture was prepared according to the recipe for the composition and then filled into a petri dish with a diameter of 5 cm and 1 cm thickness. The petri dishes were processed with either UHP or microwave treatment.

The texture of the products was measured with a Stable-Micro Systems texture analyzer. The settings were as follows:

| | |
|---|---|
| Probe diameter: | 2 cm |
| Pre-test speed: | 1.00 mm/sec |
| Test speed: | 2.0 mm/sec |
| Trigger force | 0.020 N |
| Compression distance | 4 mm |

Figure 3:
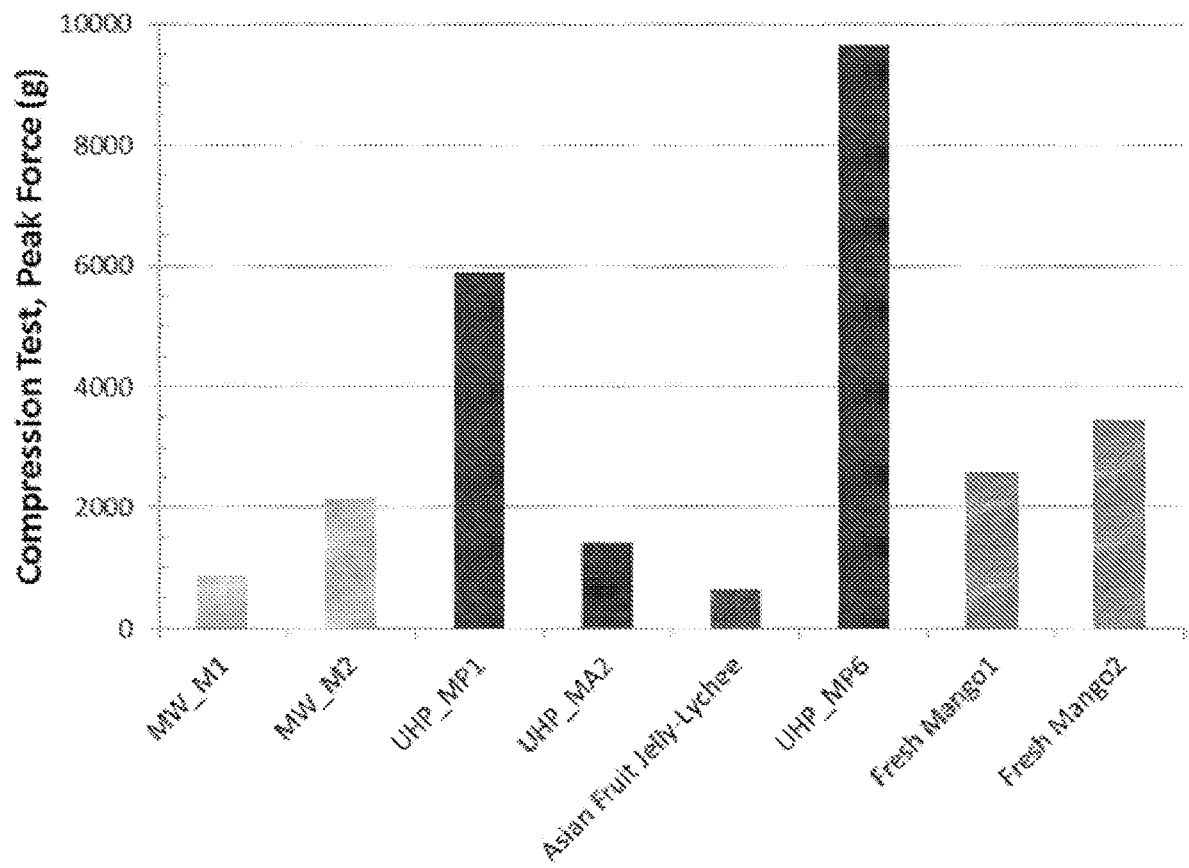
FIG. 3 is a graph showing a comparison of the uniaxial compression analysis for different compositions prepared by different methods.
Figure 4:
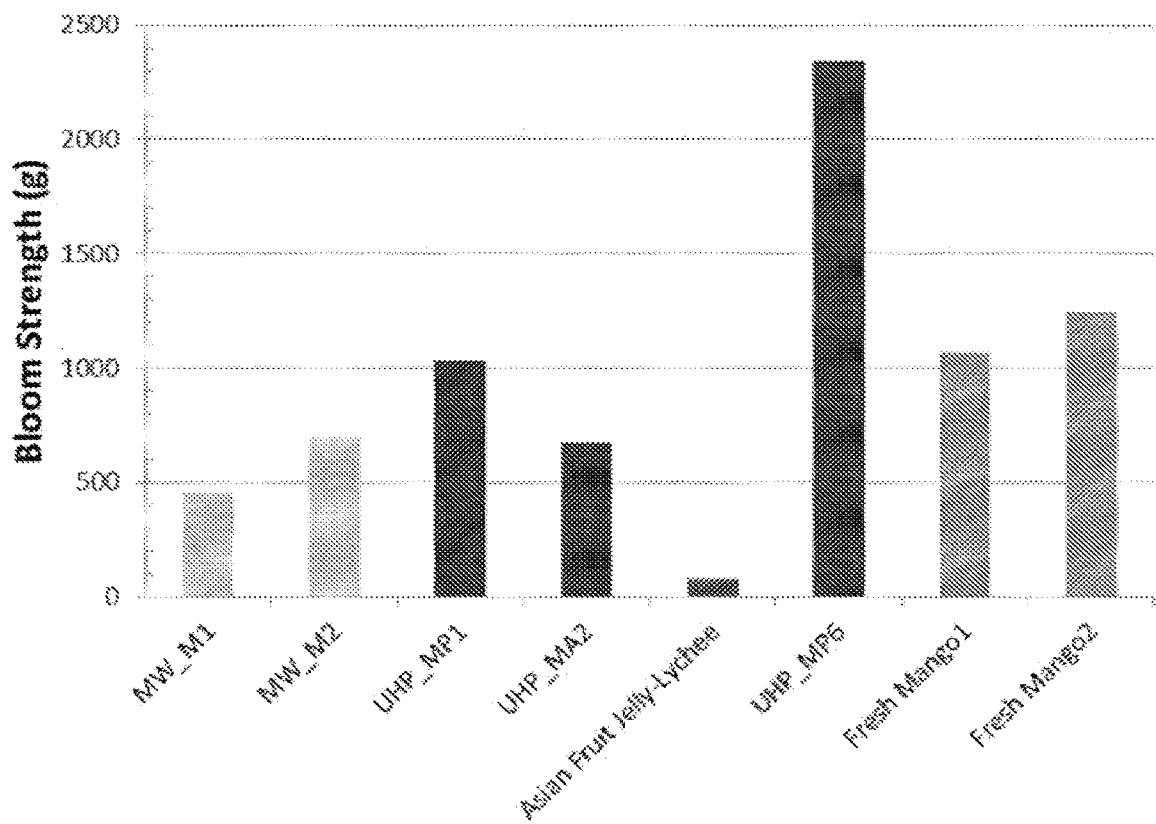
FIG. 4 is a graph showing a comparison of the texture analysis (bloom strength) test results for different compositions prepared by different methods.

Six measurements were carried out on each sample. The mean measure forces to break the gels are shown in FIGS. 3 and 4.

Acidulant Effect on Gel Formation

Because many fruits, especially citrus fruit such as oranges and lemons, are acidic, and pH is known to affect gel strength, it is important to determine the optimal pH and hydrocolloid concentration in the product formulation. To determine the optimal pH for gel formation in the edible composition, samples with varying amounts of acidulant were prepared according to the data in Table 7 below. The gel strength was then determined empirically by applying force to the container. The presence, or lack thereof, of wrinkle formation in the gel provides a quick empirical observation of relative gel strength.

TABLE 7

Relative Gel Strength for Agar Formulations Prepared via UHP Conditions

| Ingredients | Ex. 17 | Ex. 18 | Ex. 19 | Ex. 20 | Ex. 21 | Ex. 22 | Ex. 23 |
|---|---|---|---|---|---|---|---|
| Citric Acid | — | 0.1 M | 0.2 M | 0.3 | 0.3 M | 0.4 M | 0.5 M |
| pH | 7 | 2.57 | 2.4 | 2.3 | 2.3 | 2.2 | 2.0 |
| Agar | 0.575% | 0.575% | 0.575% | 0.575% | 1.75% | 0.575% | 0.575% |
| Gel Strength | ✓✓✓ | ✓✓ | ✓ | ✓✓ | No | No | No |

As can be seen in the data in Table 7, gel formation is directly affected by the pH of the sample. Lower pH formulations (Examples 21 to 23) did not form a gel while the higher pH samples did. Example 17, the control, formed the strongest gel with no acid present while Examples 18 and 19, with progressively higher acid concentrations and lower pH, formed weaker gels until the acid concentration reached a point where no gel even formed. An increase in the Agar concentration at pH 2.3 (compare Examples 20 and 21 results in gel formation. From this data, it is determined that either the pH of the mixture, the hydrocolloid concentration, or both should be optimized to form the edible composition with the desired organoleptic profile.

Examples 24-29 for Compression Testing

Samples were prepared using the heat method process similar to Example 1 according to the formulas in Table 8.

TABLE 8

| | | Ex. 24 | Ex. 25 | Ex. 26 | Ex. 27 | Ex. 28 | Ex. 29 |
|---|---|---|---|---|---|---|---|
| Fruit puree | Mango puree (~28brix) | 0 | 0 | 0 | 60 | 0 | 60 |
| | Mixed berry puree (~28brx) | 0 | 0 | 0 | 0 | 60 | 0 |
| Fruit paste concentrate (~78brix) | | 0 | 27.28 | 27.28 | 0 | 0 | 0 |
| Cacao Fruit Pulp | | 98.6 | 71.32 | 68.5 | 38.6 | 34.4 | 37.6 |
| Gelling System | Agar | 1 | 1 | 0 | 1 | 1 | 1 |
| | Gellan Gum | 0 | 0 | 0 | 0 | 0 | 1 |
| | LM Pectin | 0 | 0 | 3.1 | 0 | 0 | 0 |

TABLE 8-continued

|  | | Ex. 24 | Ex. 25 | Ex. 26 | Ex. 27 | Ex. 28 | Ex. 29 |
|---|---|---|---|---|---|---|---|
| | PME | 0 | 0 | 0.36 | 0 | 0 | 0 |
| | Calcium Lactate | 0 | 0 | 0.36 | 0 | 0 | 0 |
| Natural Flavor | | 0.4 | 0.4 | 0.4 | 0.4 | 0.4 | 0.4 |
| Protein powder | | 0 | 0 | 0 | 0 | 0 | 0 |
| Fiber powder | | 0 | | 0 | 0 | 4.2 | 0 |
| Total % | | 100 | 100 | 100 | 100 | 100 | 100 |

Figure 5:
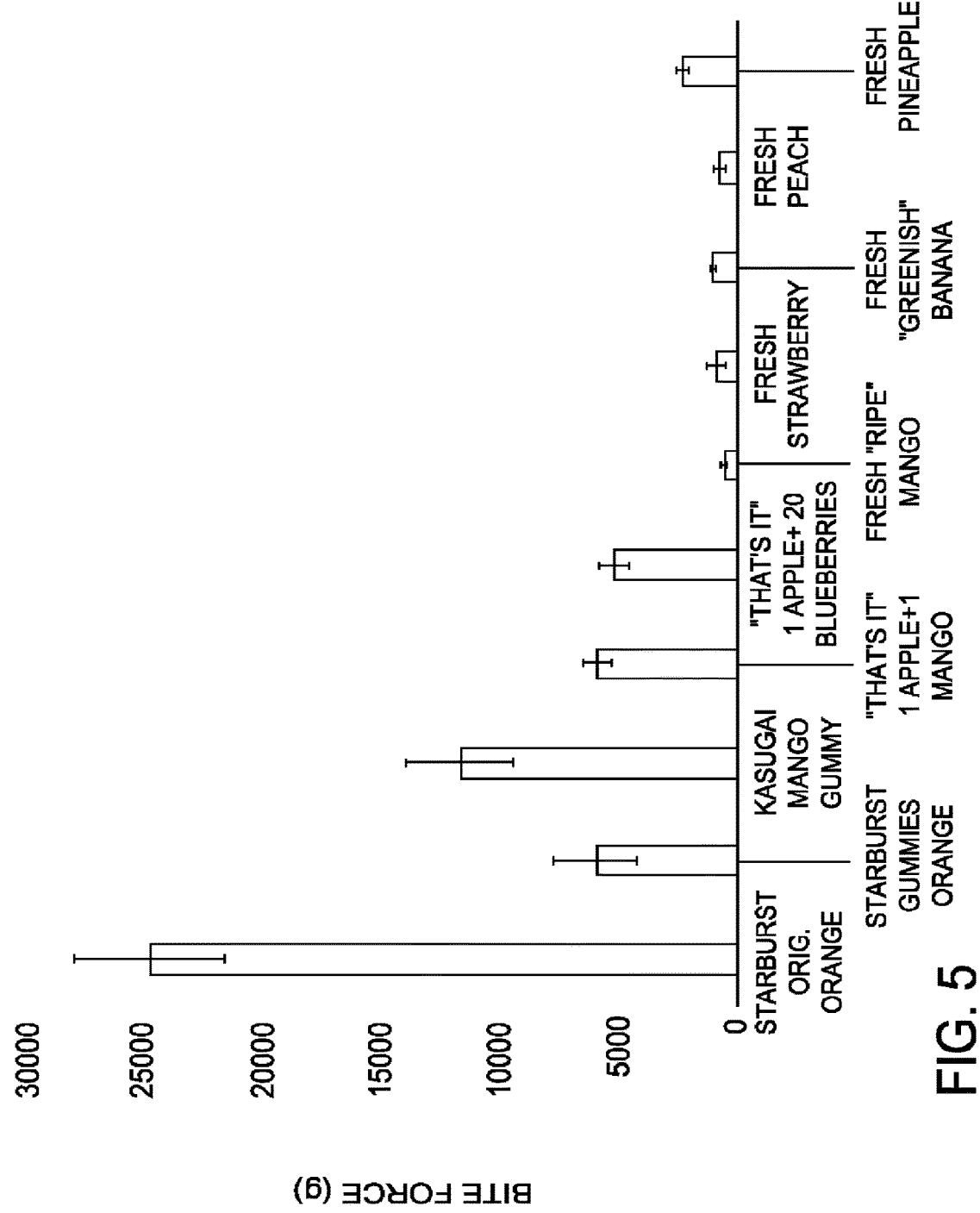
FIG. 5 is a graph comparing initial bite texture measured by a compressions test for commercial fruit products and fresh fruit pieces.

Initial Bite Compression Testing according to the above 1.00 mm/sec method was performed on three commercially available fruit candies (Starburst Original Orange, Starburst Gummies Orange and Kasugai Mango Gummies), Fruit-based shelf stable products (That's It Apple/Mango and That's It Apple/Blueberry), as well as five samples of fresh fruit (Mango, Strawberry, Banana, Peach and Pineapple). The results are shown in FIG. 5. As can be seen, the candies and fruit based products had initial bite force values ranging from 5000 to 25000 grams, whereas the fresh fruit samples had initial bite force values well below 2500 grams.

Figure 6:
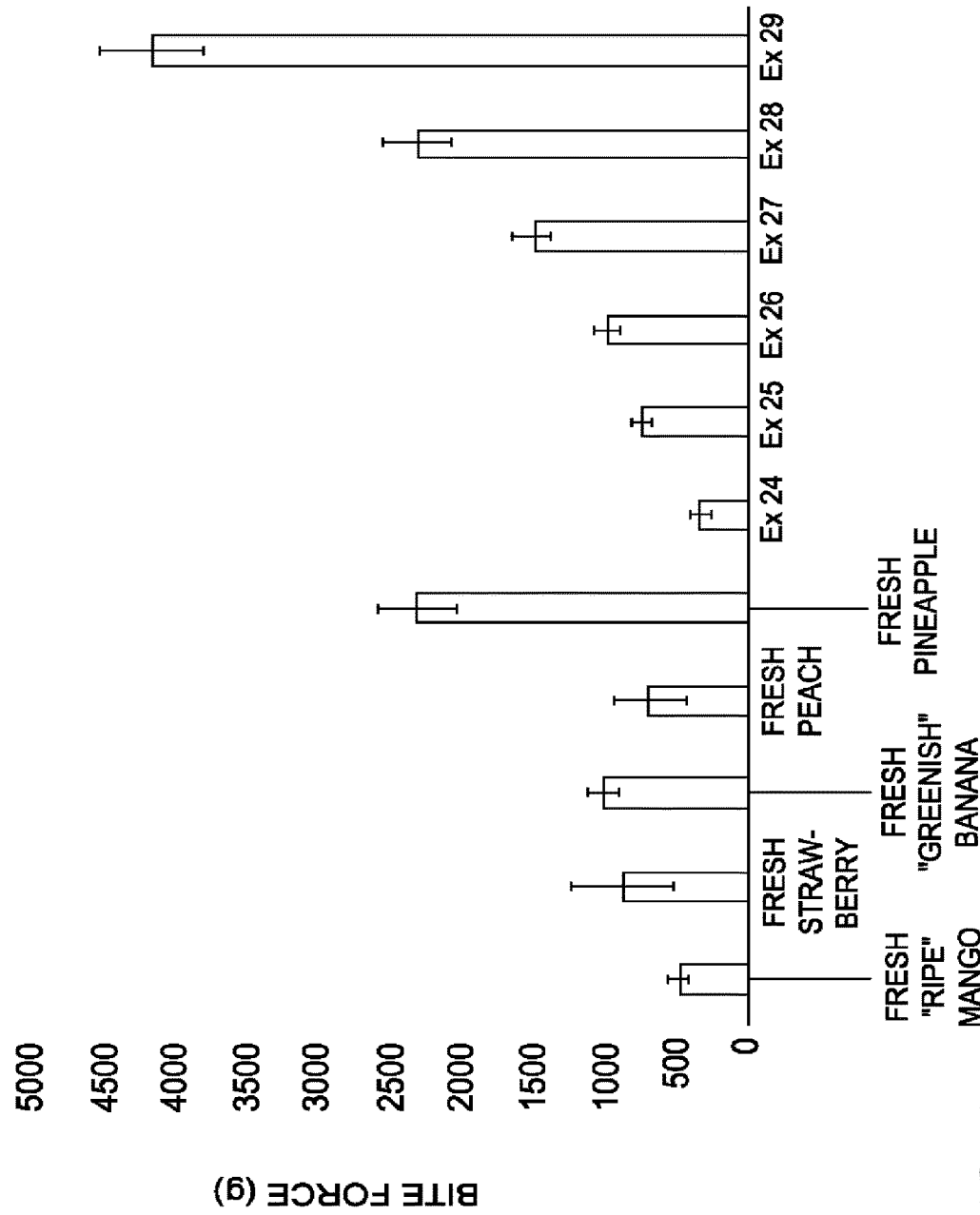
FIG. 6 is a graph comparing initial bite texture measured by a compressions test for fresh fruit pieces and compositions of the present invention.

Compression Testing was then run on the compositions of Examples 24-29 and these were plotted against the fresh fruit products in FIG. 6. Note that the fresh fruit values ranged from 500 g to about 2500 grams while inventive samples ranged from about 300 g to about 4100 grams. This demonstrates that it is possible to match the initial bite force of typical fresh fruits when preparing compositions according to the teachings of the present invention.

Additional samples were made according to the formulas in Table 9 using the process of Example 1.

This written description uses examples to disclose the invention, including the best mode, and also to enable any person skilled in the art to practice the invention, including making any compositions and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of preparing a confectionary product comprising the steps of:
    preparing a plant-based material comprising a fruit pulp, a fruit puree, a fruit juice, a vegetable puree, a vegetable pulp, or a combination thereof;
    combining the plant-based material with a hydrocolloid selected from low-methoxyl pectin, agar, or a combi-

TABLE 9

| Ingredient | Example 30 | Example 31 | Example 32 | Example 33 | Example 34 | Example 35 | Example 36 |
|---|---|---|---|---|---|---|---|
| CCP (Cacao Puree) | 95.58 | 65.98 | 0 | 0 | 0 | 0 | 0 |
| Chocolate liquor (unsweetened) | 0 | 15 | 0 | 0 | 0 | 0 | 0 |
| Mango chunks (Trader Joes' frozen mango chunks) | 0 | 0 | 68.03 | 71.53 | 50 | 67.45 | 47.865 |
| Mango Puree Concentrate (Treetop Brand) | 0 | 0 | 24.47 | 24.47 | 0 | 0 | 0 |
| Mango paste concentrate (Paradise Brand) | 0 | 0 | 0 | 0 | 45.73 | 27.28 | 0 |
| Carrot chunks | 0 | 0 | 0 | 0 | 0 | 0 | 47.865 |
| Whole Wild Blueberry frozen pieces (Trader Joe's) | 0 | 0 | 6 | 0 | 0 | 0 | 0 |
| Cayenne Pepper (1%) | 0 | 0 | 0 | 0 | 0 | 1 | 0 |
| Monk fruit | 0.15 | 0.15 | 0 | 0 | 0 | 0 | 0 |
| Citric Acid | 0 | 0 | 0 | 2.5 | | | |
| Honey | 0 | 15 | 0 | 0 | 0 | 0 | 0 |
| Agar (AG-SW) | 0 | 0 | 1.1 | 1.1 | 0 | 0 | 0 |
| LME (Cargill Unipectin LM) | 3.1 | 3.1 | 0 | 0 | 3.1 | 3.1 | 3.1 |
| Pectinase PME (NOVO-SHAPE) | 0.36 | 0.36 | 0 | 0 | 0.36 | 0.36 | 0.36 |
| Calcium Lactate | 0.36 | 0.36 | 0 | 0 | 0.36 | 0.36 | 0.36 |
| Ascorbic Acid | 0.05 | 0.05 | 0 | 0 | 0.05 | 0.05 | 0.05 |
| Orange Flavor | 0.4 | 0 | 0 | 0 | 0 | 0 | 0 |
| Mango Flavor | 0 | 0 | 0.4 | 0.4 | 0.4 | 0.4 | 0.4 |
| Total | 100 | 100 | 100 | 100 | 100 | 100 | 100 | nation thereof in an amount of from about 2 wt. % to about 12 wt. % and a calcium ion source to form a combined composition;

subjecting the combined composition to electromagnetic radiation for a period of from about 5 seconds to about 10 minutes sufficient to sterilize the plant-based material; and transferring the combined composition into a single or multiple serve package by an aseptic packaging process to provide a confectionary product in gel form, wherein the confectionary product comprises active pectin methyl esterase and has a pH of less than 4.5.

2. The method of claim 1, wherein the hydrocolloid is agar.

3. The method of claim 1, wherein the hydrocolloid is a low-methoxyl pectin.

4. The method of claim 3, wherein the combined composition further comprises a pectinase enzyme.

5. The method of claim 4, wherein the pectinase enzyme is pectin methyl esterase.

6. The method of claim 1, wherein a source of the plant-based material is selected from the group consisting of mango, cacao pulp, chocolate liquor, carrot, beet, purple sweet potato, orange, sweet potato or a combination thereof.

7. The method of claim 1, wherein the combined composition further comprises an acidulant.

8. The method of claim 7, wherein the acidulant is selected from the group consisting of acetic acid, citric acid, tartaric acid, malic acid, lactic acid, fumaric acid, ascorbic acid and mixtures thereof.

9. The method of claim 1, wherein the electromagnetic heating is generated via microwave energy.

10. The method of claim 1, wherein the electromagnetic heating is applied in a continuous flow process.

11. The method of claim 1, wherein the electromagnetic heating is applied in a batch process.

12. The method of claim 1, further comprising the step of adding one or more additives to the mixture, wherein said additives are selected from the group consisting of a nutritional supplement, sweetener, an antioxidant, a coloring, a flavoring, a spice or a combination thereof.

13. The method of claim 12, wherein the sweetener is a plant-derived high intensity sweetener.

14. The method of claim 13, wherein the plant-derived high intensity sweetener is selected from the group consisting of luo han guo, stevia, thaumatin or combinations thereof.

15. The confectionary product prepared by the method of claim 1.

16. The confectionary product of claim 15,
wherein said confectionary product
(i) is dimensionally stable as a semi-solid or solid for at least 3 months,
(ii) is stable for at least 12 months at ambient conditions when maintained in a sealed package,
(iii) has a moisture content of greater than 50 wt. %,
(iv) has a pH of less than 4.0,
(v) has a water activity of at least 0.5,
(vi) is commercially sterile,
(vii) is free of artificial flavors,
(viii) has a solids content of greater than 10 wt. %, and
(ix) does not exhibit syneresis, and
wherein the confectionary product is contained in a sealed package.

17. The method according to claim 5, wherein the method does not inactivate pectin methyl esterase present in the plant-based material and/or the combined composition.

\* \* \* \* \*